United States Patent [19]
Yasuda et al.

[11] 4,232,292
[45] Nov. 4, 1980

[54] DATA TRANSMITTER DEVICE

[75] Inventors: Katsuya Yasuda, Yokohama; Akio Adachi, Kawasaki, both of Japan

[73] Assignee: Hochiki Corporation, Tokyo, Japan

[21] Appl. No.: 17,769

[22] Filed: Mar. 5, 1979

[30] Foreign Application Priority Data

Mar. 7, 1978 [JP] Japan ................................ 53-24961

[51] Int. Cl.[2] ................................ H04Q 5/00
[52] U.S. Cl. ................................ 340/147 SY; 340/518
[58] Field of Search ................................ 340/147 SY, 518; 58/23 R, 50 R

[56] References Cited

U.S. PATENT DOCUMENTS 3,566,399 2/1971 Weld ................................ 340/518

*Primary Examiner*—Harold I. Pitts
*Attorney, Agent, or Firm*—Sughrue, Rothwell, Mion, Zinn and Macpeak

[57] ABSTRACT

A data transmission system having a clock pulse generator 1, a plurality of transmitters each including a plurality of switches 7-1 for inputting data, gate circuits 5-1 receiving the outputs of said plurality of switches through one inputs thereof and temporary memory circuits 6-1 for temporarily storing the outputs of the gate circuits. Scanning circuits 3-1 apply outputs successively in synchronization with the output pulses from the clock pulse generator. The transmitters are interconnected first by a synchronous line $S_1$ adapted to apply the output pulses of the clock pulse generator to the scanning circuits in the transmitters and secondly by a signal line $S_2$ connecting the outputs terminals of the gate circuits in the transmitters.

15 Claims, 3 Drawing Figures

DATA TRANSMITTER DEVICE

BACKGROUND OF THE INVENTION

This invention relates to a data transmitting device with which data at different positions can be monitored at a plurality of places.

The term "data" as herein used is intended to mean data as to sensor output, for example fire detection output of a fire alarm.

There are many cases in which it is necessary to provide a data transmitting device by which the data which generates or is generated at a place can be monitored at a plurality of different locations.

In this connection, two conventional methods are well known in this art. In the first, transmitters and receivers disposed at different locations are interconnected by signal lines separately according to data. In the second, address codes are employed.

In the first method, the data may be transmitted in an analog mode or in a digital mode. However, this method is still disadvantageous in that it is necessary to use a number of signal lines. The number of signal lines is increased as the number of data types increases, and additionally the number of signal lines is increased as the number of locations where data transmission and reception should be effected is increased. Such a system requires extensive maintenance, needs a great deal of human attention, and is generally costly.

In the second method, a number of data can be transmitted through one set of signal lines. However, the second method is also disadvantageous in that the device is intricate and accordingly high in manufacturing cost. In addition, with the device according to the second method, the period of time required for data transmission is increased with increasing numbers of data, and erroneous operation is liable to occur.

SUMMARY OF THE INVENTION

In view of the foregoing difficulties in the prior art, an object of this invention is to provide a data transmitting system simple in construction in which all of the above-described drawbacks have been eliminated.

It is another object of this invention to provide a data scanning system that is of simple construction that is reliable and inexpensive to manufacture.

These and other objects of the invention are accomplished in a data transmission system having a clock pulse generator, a plurality of transmitters each of which includes a plurality of switches for inputting data. Gate circuits receive the outputs of the plurality of switches through one inputs thereof, and temporary memory circuits temporarily store the outputs of the gate circuits. Scanning circuits are employed for applying outputs successively in synchronization with the outputs pulses of the clock pulse generator. The transmitters are interconnected by a synchronous line adapted to apply the output pulses of the clock pulse generator to the scanning circuits in the transmitters and by a signal line connecting the output terminals of the gate circuits in said transmitters.

A second embodiment uses a first transmitter having a clock pulse generator and a plurality of first switches for inputting data. First gate circuits receive the outputs of the first switches through one input terminal thereof and first memory circuits temporarily store the outputs of the first gates. First scanning circuits are employed for applying outputs to the other input terminals of the first gate circuits successively in synchronization with the output pulses of the clock pulse generator. A circuit generates a clear signal whose pulse width is longer than that of the output pulse of the clock pulse signal and a second gate circuit receives the output pulses of the clock pulse generator and the clear signal generator. A circuit is employed for clearing the first scanning circuits.

A plurality of second transmitters each includes a plurality of second switches corresponding to data inputted through the first switches. Third gate circuits receive the outputs of the second switches through one input terminal thereof and second memory circuits temporarily store the outputs of the third gate circuits. Second scanning circuits receive the outputs of the second gate circuits and apply outputs to the other input terminals of the third gate circuits in synchronization with the output pulses of the clock pulse generator. An integrator integrates the respective output of the second gate circuits to clear the second scanning circuit. The first and second transmitters are interconnected first by a synchronous line adapted to input the outputs of the second gate circuits to the transmitters and secondly by a signal line connecting the output terminals of the first and third gate circuits in the first and second transmitters.

This invention will be described with reference to its preferred embodiments.

DESCRIPTION OF THE PREFERRED EMBODIMENTS

Figure 1:
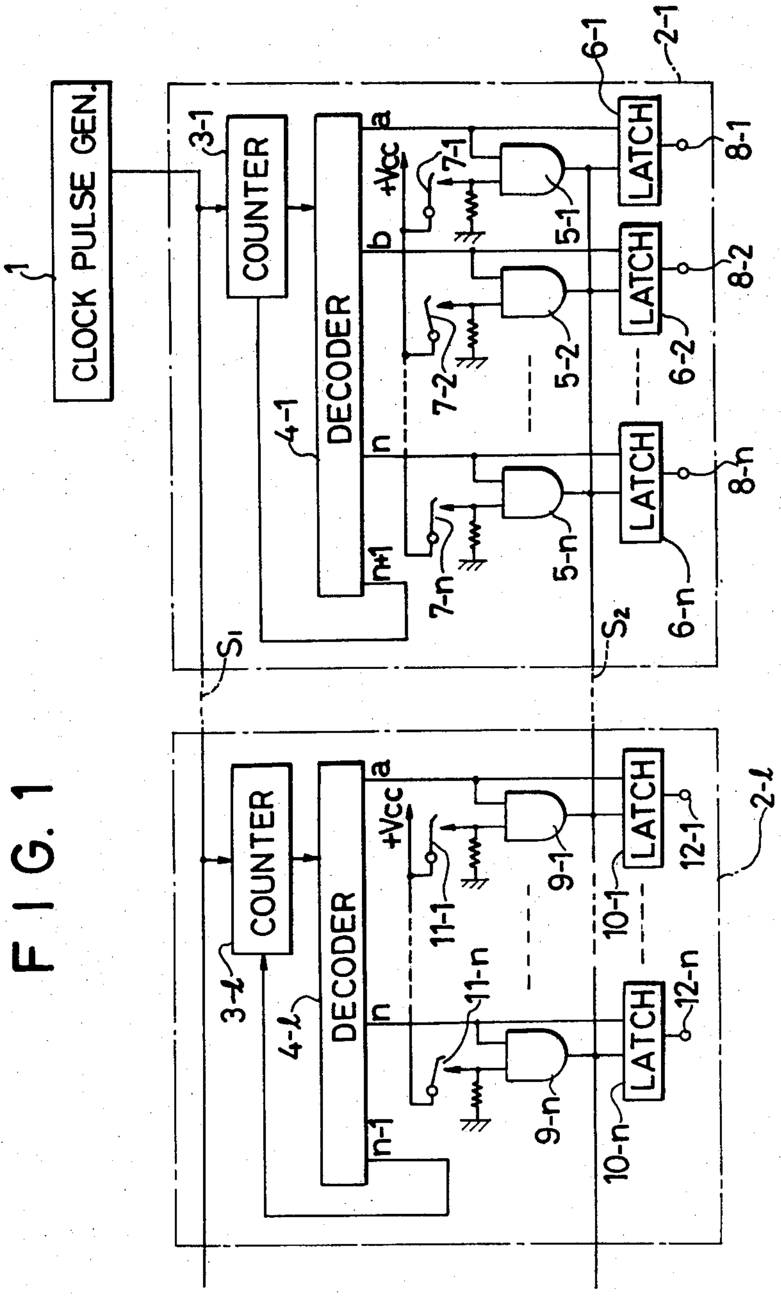
FIG. 1 is a block diagram showing a first embodiment of a data transmitting device according to the invention.

FIG. 1 is a block diagram showing a first embodiment of a data transmitting device according to the invention. Referring to FIG. 1, reference numeral 1 designates a clock pulse generator; and reference characters 2-1, . . . , 2-l, . . . designate n transmitters which are placed at different positions, respectively, and receive the output pulse of the clock pulse generator 1 through a synchronous line $S_1$.

Since the n transmitters 2-1, . . . , 2-l, . . . are identical to one another, a typical one of them, namely, the transmitter 2-1 will be described.

The arrangement of the transmitter 2-1 is as follows: Reference numeral 3-1 designates a counter which receives and counts the output pulses of the clock pulse generator 1. The output of the counter 3-1 is applied to a decoder 4-1 in which the count is decoded into (n+1) outputs in synchronization with the output pulse of the clock pulse generator 1. The output terminals a, b, . . . and n of the decoder 4-1 are connected to input terminals of n AND circuit 5-1, 5-2, . . . and 5-n, respectively. Thus, a scanning circuit operating to successively apply outputs to the input terminals of the AND circuits 5-1 through 5-n in synchronization with the output pulse of the clock pulse generator 1 with the aid of the counter 3-1 and the decoder 4-1 is defined. n switches 7-1, 7-2, . . . and 7-n are placed in "on" state, or turned on, with the application of data A, B, . . . and N, respectively.

One terminal of the switches 7-1 through 7-n are connected to a common connection point which is connected to an electric source +Vcc, and the other terminals are connected to the other input terminals of the AND circuits 5-1 through 5-n, respectively. Hence, when the switches 7-1 through 7-n are turned on, the inputs are applied to the other input terminals of the AND circuits 5-1 and 5-2, respectively. The outputs of the AND circuits 5-1 through 5-n and the outputs a, b, . . . and n of the decoder 4-1, which correspond to the AND circuits 5-1 through 5-n, are applied to temporary memory circuits, that is, latch circuits 6-1, 6-2, . . . and 6-n, respectively.

The output terminals of the latch circuits 6-1 through 6-n are connected to light-emitting elements 8-1 through 8-n so that the light-emitting elements are turned "on" when the latch circuits 6-1 through 6-n provide outputs, respectively.

The terminal (n+1) of the decoder 4-1 is connected to the clear terminal of the counter 3-1, so that the counter 3-1 is cleared when the output is provided at the terminal (n+1) of the decoder 4-1.

The remaining transmitters are identical as in the above-described transmitter 2-1. For instance, the l-th transmitter comprises: a counter 3-l: a decoder 4-l: AND circuits 9-1, 9-2, . . . and 9-n; latch circuits 10-1 through 10-n; switches 11-1 through 11-n; and light-emitting elements 12-1 through 12-n. The switches 11-1 through 11-n are provided in correspondence to the above-described switches 7-1 through 7-n, respectively. Thus, when the data A, for instance, is inputted through the transmitter 2-l, the switch 11-1 is placed in the "on" state.

The transmitters 2-1, 2-2, . . . , 2-l, . . . are interconnected as shown in FIG. 1. More specifically, the transmitters are connected so that the clock pulses are applied through the synchronous line $S_1$ to the input terminals of the counters 3-1, 3-2, . . . , 3-n, . . . , and the outputs of the AND circuits 5-1 through 5-n, . . . 9-1 through 9-n, . . . are connected together to a signal line $S_2$.

In the first embodiment of the data transmitting device thus organized, the outputs are provided successively (not overlapped) at the output terminals a, b, c, . . . n and n+1 of the decoders 4-1, 4-2, . . . , 4-l, . . .

These outputs are applied to the one input terminal of the AND circuits (5-1, . . . 9-1, . . . ), (5-2, . . . 9-2, . . . ) . . . (5-n, . . . 9-n, . . . ) successively, to scan the states of the switches (7-1, . . . 11-1, . . . ), (7-2, . . . , 11-2, . . . ) . . . (7-n, . . . , 11-n, . . . ) in synchronization with the output pulses of the clock pulse generator 1.

When all of the switches are in the "off" state, the outputs are provided at the output terminals a, b, . . . and n of each of the decoders 4-1, 4-2, . . . , 4-l, . . . , in response to the output pulses. However no input is applied to the light-emitting elements 8-1, . . . 12-1, . . . When the outputs are provided at the output terminals (n+1) of the decoder 4-1, . . . , 4-l, . . . , the counters 3-1, . . . , 3-l, . . . are cleared respectively. Thus, the above-described operation is repeated.

It is assumed that the data B is inputted from the transmitter 2-1. Then, the switch 7-2 is placed in the "on" state. Thus, when the output terminals b of the decoders 4-1, . . . 4-l, . . . provide the outputs, the AND circuit 5-2 provides the output. The output of the AND circuit 5-2 is applied to the latch circuit 6-2 to cause the light-emitting element 8-2 to emit light. Simultaneously the output of the AND circuit 5-2 and the outputs provided at the output terminals b of the decoders 4-2, . . . , 4-l . . . are applied to the latch circuits 10-12, . . . of the other transmitters 2-2, . . . , 2-l, . . . As a result all of the corresponding light-emitting elements 8-2, . . . , 12-2, . . . are turned on. Thus, the input of the data B is transmitted to the transmitters 2-1, . . . , 2-l.

The light emission of the light-emitting elements 8-2, . . . , 12-2, . . . are maintained unchanged by the latch circuits 6-2, . . . , 10-2, . . . until the scanning of the decoders 4-1, . . . , 4-l, . . . is advanced and these decoders provide the outputs at the output terminals b. Even if the switch 7-2 is turned off during this period, the light emission of the light-emitting elements 8-2, . . . , 12-2, . . . is maintained. If the switch 7-2 is in the "on" state when the output terminals b are scanned again, the light-emitting elements 8-2, . . . , 12-2, . . . emit light continuously until the output terminals b are scanned next.

The operations in the other cases are similar to the operation described above. For instance, in the case where the switch 11-k is turned on to input the data K from the transmitter 2-l the light-emitting elements 8-k, . . . , 12-k, . . . of the transmitters 2-1, . . . , 2-l, . . . emit light. Thus, the inputting of the data K is transmitted to the transmitters 2-1, . . . , 2-l, . . .

A second embodiment of the data transmitting system according to the invention will be described with respect to FIG. 2.

Figure 2:
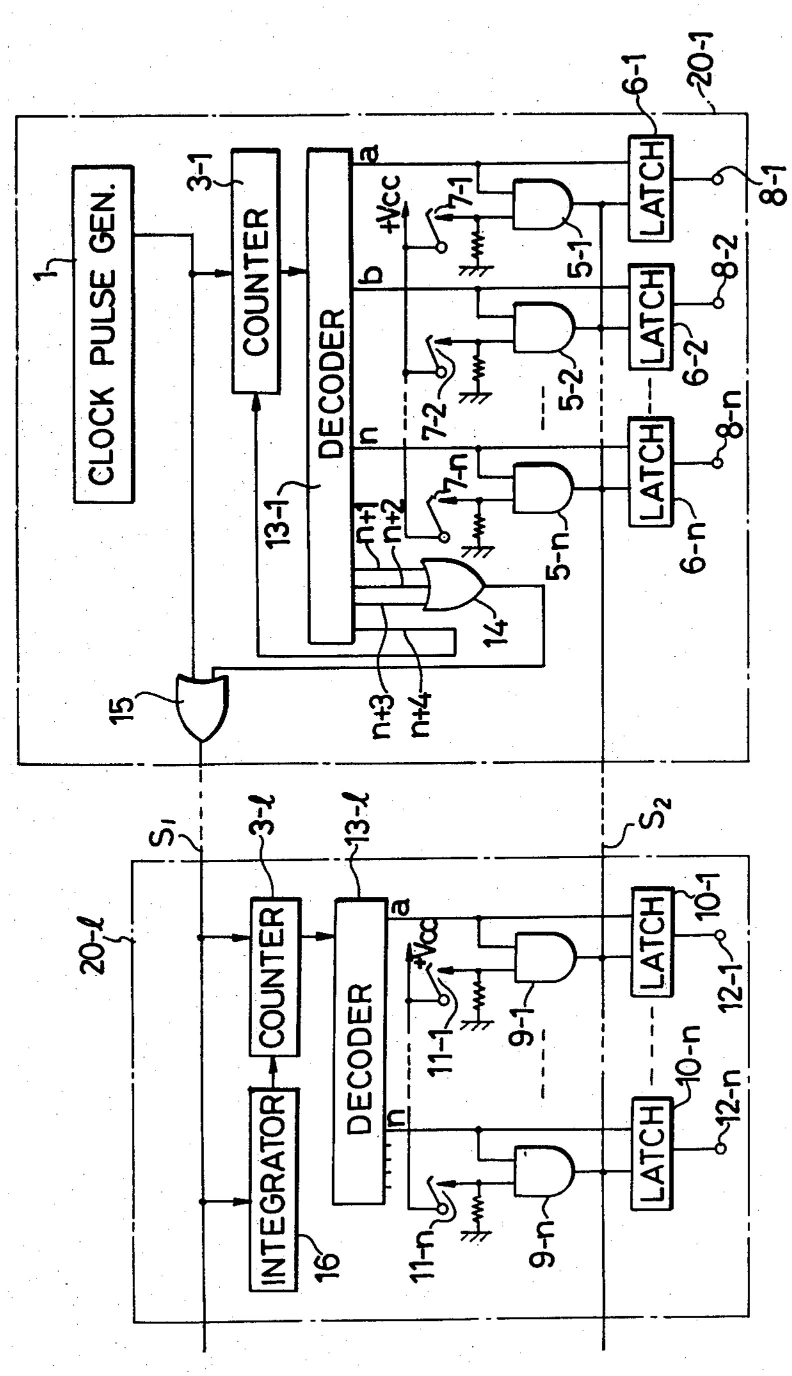
FIG. 2 is a block diagram showing a second embodiment of the data transmitting device according to the invention.

In FIG. 2, those components which have been previously described with reference to FIG. 1 have therefore been similarly numbered. In the second embodiment, a reset pulse is provided by one transmitter to simultaneously clear the remaining transmitters.

In FIG. 2, reference character 20-1 designates a first transmitter. This first transmitter 20-1 is provided with a clock pulse generator 1, the output of which is applied to a counter 3-1 and an OR circuit 15. The output of the counter 3-1 is applied to a decoder 13-1 which operates to decode the output of the counter 3-1 into (n+4) outputs in synchronization with the output pulse of the clock pulse generator 1. The output terminals a, b, . . . and n of the decoder 13-1 are connected to input terminals of n AND circuits 5-1, 5-2, . . . and 5-n, respectively. Thus, a scanning circuit is formed which operates to successively apply the outputs to the input terminals of the AND circuit 5-1 through 5-n in synchronization with the output pulses of the clock pulse generator 1 with the aid of the counter 3-1 and the decoder 13-1.

The terminals of n switches 7-1, 7-2, . . . and 7-n which are placed in "on" state when data A, B, . . . and N are inputted, respectively and they are connected together to a common connection point which is connected to an electric source +Vcc. The other terminals are connected to the other input terminals of the AND circuits 5-1 through 5-n, respectively, so that, when the switches 7-1 through 7-n are in the "on" state, the inputs are applied to the other input terminals of the AND circuits 5-1 through 5-n, respectively. The outputs of the AND circuits 5-1 through 5-n, and the outputs a, b, . . . and n of the decoder, which correspond to the AND circuits 5-1 through 5-n, are inputted to temporary memory devices, latch circuits 6-1, 6-2, . . . and 6-n, respectively. The output terminals of the latch circuits 6-1 through 6-n are connected to light emitting elements 8-1, 8-2, . . . and 8-n so that the latter emit when the latch circuits 6-1 through 6-n provide an output, respectively.

The output terminals (n+1), n+2) and (n+3) of the decoder 13-1 are connected to the input terminals of an OR circuit 14. The output of OR circuit 14 is applied to an input terminal of OR circuit 15. The output terminal (n+4) of the decoder 13-1 is connected to the clear terminal of the counter 3-1, so that the counter 3-1 is cleared when the output is provided at the output terminal (n+4) of the decoder 13-1.

In FIG. 2, reference characters 20-2, . . . , 20-l, . . . designate n-1 second transmitters which are disposed at different positions, respectively, and receive the output pulse of the clock pulse generator 1 through a synchronous line $S_1$.

Since the n-1 second transmitters are equal in construction to one another, a typical one, for instance the l-th transmitter will be described. A counter 3-l receives the output of the OR circuit 15. The connection and function of the counter 3-l, a decoder 13-l, AND circuits 9-1 through 9-n, switches 11-1 through 11-n, latch circuits 10-1 through 10-n and light-emitting circuits 12-1 through 12-n are similar to those in the first transmitter 20-1.

An integrator 16 is provided to receive the output of the OR circuit 15 and to clear the counter 3-l with its output. The integrator 16 is provided with a time constant circuit which provides an output sufficient to clear the counter 3-l only when a pulse input continuous for three periods of the output pulse of the clock pulse generator 1 is provided.

The first transmitter 20-1 and the second transmitters 20-2, 20-3, . . . 20-l, . . . are interconnected as shown in FIG. 2. More specifically, the output terminal of the OR circuit 15 is connected through the synchronous line $S_1$ to the counters 3-2, . . . 3-l, . . . , and the output terminals of the AND circuits 5-1 through 5-n, . . . 9-1 through 9-n, . . . are connected together to the signal line $S_2$.

In the first transmitter 20-1, the counter 3-1 and the decoder 13-1 from a first scanning means; the switches 7-1 through 7-n, first switches; the AND circuits 5-1 through 5-n, first gate circuits; the latch circuits 6-1 through 6-n, first memory circuits; the output terminals (n+1), (n+2) and (n+3) of the decoder 13-1, clear signal generating means; the output terminal (n+4) of the decoder 13-1, a clear means; and the OR circuit 15, a second gate circuit.

In the transmitter 20-l, the counter 3-l and the decoder 13-l form a second scanning means; the switches 11-1 through 11-n, second switches; the AND circuits 9-1 through 9-n, third gate circuits; and the latch circuit 10-1 through 10-n, second memory circuits.

In the second embodiment of the data transmitting device thus organized, the outputs are successively (not overlapped) provided at the output terminals a, b, . . . and n of the decoders 13-1, . . . 13-l, . . . in synchronization with the output pulses of the clock pulse generator 1 and are applied to one input terminal of the AND circuits (5-1, . . . , 9-1, . . . ), (5-2, . . . , 9-2, . . . ) . . . to scan the states of the switches (7-1, . . . , 11-1, . . . ), 7-2, . . . , 11-2, . . . ) . . . The operation of this circuit, and the operation in the case where any one of the switches (7-1, . . . , 7-n) . . . (11-1, . . . , 11-n) is in the "on" state are similar to those in the first embodiment described above and are therefore not be described in detail.

When the output is provided at the output terminal (n+1) of the decoders 13-1, . . . 13-l, . . . , then the output of the decoder 13-1 applied to the OR circuit 14. In the case also when the outputs are provided at the output terminals (n+2) and (n+3), the outputs are applied to the OR circuit 14. In this case, the outputs of the decoders 13-1, 13-2, . . . 13-l, . . . are not overlapped, but the outputs of the adjacent output terminals (n+1), (n+2) and (n+3) are continuous. Therefore, the OR circuit 14 provides an output corresponding to three periods of the output pulse of the clock pulse generator 1. This output of the OR circuit 14 is subjected to integration by the integrators 16 to clear the counters 3-2, . . . , 3-l, . . .

Thereafter, the counter 3-1 is cleared by the output provided at the output terminal (n+4) of the decoder 13-1. Subsequently, the outputs are provided at the output terminals of the decoders 13-1, . . . 13-l, . . . in synchronization with the output pulses of the clock pulse generator 1, to scan the states of the switches (7-1, . . . , 11-1, . . . ), 7-2, . . . , 11-2, . . . ) . . .

As was described above, in the second embodiment, the counters in the transmitters are cleared by the output of the decoder in the first transmitter. Therefore, even if the synchronization of the transmitters is shifted by noise mixed in the transmission path, the counters are positively cleared within one period of the decoder. At the next scanning cycle the transmitters are synchronized positively when the decoders provide the outputs at the output terminals a. Thus, the period during which the transmitters are synchronous is minimized.

A modification of the second embodiment of the data transmitting device according to the invention will be described.

In this modification, the counters are cleared by a circuit which is different from that in the second example.

Figure 3:
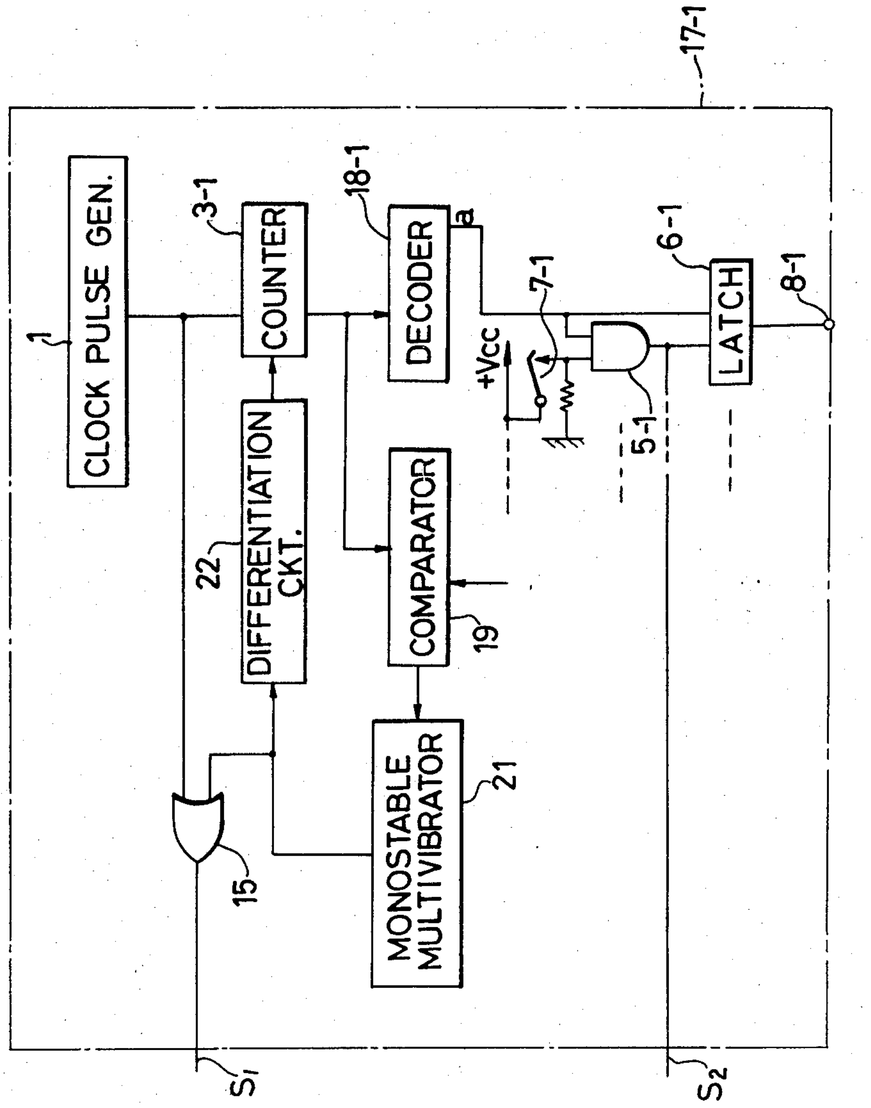
FIG. 3 is a block diagram showing one modification of the second embodiment.

FIG. 3 is a block diagram showing a first transmitter for a description of the modification according to the invention.

In FIG. 3, those components which have been described with reference to the second embodiment have therefore been similarly numbered. Reference character 17-1 designates the first transmitter. In this transmitter, the arrangements and functions of a clock pulse generator 1, a counter 3-1, a decoder 18-1, AND circuits 5-1 through 5-n, latch circuit 6-1 through 6-n are similar to those in the second embodiment, and are therefore, not described in detail. Only the operation of clearing the counter 3-1 will be described.

The output of the counter 3-1 is applied to one input terminal of a comparator 19 and to the other input terminal is a predetermined count number. This second input is provided when an output is produced at the output terminal of the decoder 18-1 to be cleared.

A monostable multivibrator 21 receives the output of the comparator 19. The output of the monostable multivibrator 21 is applied to one input terminal of an OR circuit 15 and to a differentiation circuit 22, the output of which is connected to clear the counter 3-1.

In the first transmitter 17-1, the comparator 19 and the monostable multivibrator 21 form a clear signal generator and the differentiation circuit 22, a clear means.

In the modification of the FIG. 2 circuit thus organized, when both inputs to the comparator 19 coincide, the monostable multivibrator 21 is triggered to produce an output whose pulse width is longer than that of the output pulse of the clock pulse generator 1, or for example corresponds to three periods thereof. This output is applied to the integrators in the second (other) transmitters to clear the counters therein, and at the fall of the pulse the counter 3-1 is cleared.

In the above-described embodiments and modification, the same number of data inputting switches are provided in each transmitter. However, in the case where a transmitter has data which should not be transmitted therefrom, the switches relating to the data may be removed from the relevant transmitters whcih should not receive the data. Furthermore, in the case where no data display is required in a transmitter, the latch circuits and the light emitting elements occupied by the corresponding data may be removed from the relevant transmitters which should not diaplay the data.

As is clear from the above description, the data transmitting device according to the invention comprises a plurality of transmitters each of which includes a plurality of switches for inputting data, gate circuits receiving the outputs of the switches as their one inputs, and latch circuit means for temporarily storing the outputs of the gate circuits. Hence, the presence or absence of the outputs of the switches is detected by scanning with the aid of the clock pulse, the transmitters being interconnected by the synchronous line adapted to transmit the clock pulse and by the signal line connecting the outputs of the gate circuits. Thus, with the data transmitting device, the data applied to one switch in one transmitter can be transmitted to the other transmitters.

Since the data transmitting device employs the system of transmitting a signal from each transmitter directly to another transmitter, the period of time required for transmitting and receiving a signal is very short.

Furthermore, the transmitters are interconnected only by the synchronous line and the signal line (although naturally a ground line is necessary). Therefore, the wiring between the transmitters is very simple.

In addition, if it is required to add another transmitter to the device, the addition can be readily achieved merely by extending the synchronous line and the signal line.

In the case where the clear signal from one transmitter is used to clear the other transmitters, the operation can be achieved through the synchronous line and the signal line extending through the transmitters.

Each transmitter is a very simple arrangement. It is apparent that while the invention has been described herein, modifications are possible without departing from the essential scope thereof.

What is claimed is:

1. A data transmission system comprising: a clock pulse generator generating output clock pulses, a plurality of transmitters, each transmitter including scanning means receiving clock pulses, a plurality of switches for inputting data, gate circuit means receiving the outputs of said plurality of switches through one input thereof, memory means for temporarily storing the outputs of said gate circuit means, and wherein said scanning means applies output signals to said gate circuit means successively in synchronization with the clock pulses of said clock pulse generator, said transmitters being interconnected first by a synchronous line adapted to apply the output pulses of said clock pulse generator to the scanning means in said plurality of transmitters and secondly by a signal line connecting the output terminals of said gate circuit means in said plurality of transmitters.

2. The system of claim 1 wherein said scanning means in each transmitter comprises a counter receiving the output pulses of said clock pulse generator and a decoder receiving the counter output, said decoder generating an output to said gate circuit means.

3. The system of claims 1 or 2 wherein said gate circuit means comprises n AND gates, each AND gate receiving the output of one switch as an output.

4. The system of claim 3 wherein said memory means comprises n latch circuits each latch circuit-receiving the respective output from an associated AND gate.

5. The system of claim 1 further comprising clear signal generating means to reset said counter following a predetermined number n of clock pulses.

6. The system of claim 5 wherein said clear signal generating means comprises in the first transmitter, a plurality of additional outputs of said decoder $n+1$ to $n+p$ and an OR circuit receiving the additional outputs of said decoder, where p is a predetermined number of clock pulses.

7. The system of claim 6 further comprising an integrator disposed in each transmitter except said first transmitter receiving the output of said OR gate and providing an output signal to reset the counter in said transmitter.

8. The system of claim 5 wherein said clear signal generating means comprises in said first transmitter comparator means receiving the output of said counter, pulse generator means adapted to generate a pulse of predetermined pulse width when said comparator is in coincidence with a predetermined value and a differentiation circuit receiving said pulse of predetermined pulse width and generating a signal to clear said counter in said first transmitter.

9. The system of claim 8 wherein said pulse width is longer than a clock pulse width, and further comprising an OR gate receiving said pulse of predetermined width.

10. The system of claim 9 further comprising an integrator in each transmitter except said first transmitter receiving the output of said OR gate and providing an output signal to reset the counter in said transmitter

11. A data transmission system comprising:

a first transmitter including: a clock pulse generator; a plurality of first switches receiving input data; first gate circuits respectively receiving the outputs of said first switches through one input terminal thereof; first memory means for temporarily storing the outputs of said first gate circuits; first scanning means receiving clock pulses and applying signals to second input terminals of said first gate circuits successively in synchronization with the output pulses of said clock pulse generator; means for generating a clear signal having a pulse width is longer than that of the output pulse of said clock pulse signal; a second gate circuit receiving the output pulse of said clock pulse generator and the output of said means for generating the clear signal; and means for clearing said first scanning means, and a plurality of second transmitters each including: a plurality of second switches corresponding to data inputted through said first switches; third gate circuits receiving the outputs of said second switches at one input terminal thereof; second memory means for temporarily storing the outputs of said third gate circuits; second scanning means receiving the outputs of said second gate circuits and applying an output signal to second input terminals of said third gate circuits in synchronization with the output pulses of said clock pulse generator; and an integrator for integrating the outputs of said second gate circuits to clear said second scanning circuit, said first and second transmitters being interconnected first by a synchronous line adapted to input the outputs of said second gate circuits to said transmitters and second by a signal line connecting the output terminals of said first and third gate circuits in said first and said plurality of second transmitters.

12. The system of claim 11 wherein said means for generating a clear signal comprises a monostable multivibrator.

13. The system of claim 12 wherein the means for clearing said first scanning means comprises a differentiation circuit receiving the clear signal generated by said multivibrator.

14. The system of claims 11 or 13 wherein said first and third gate circuits comprise AND gates corresponding respectively to the number of switches in each transmitter.

15. The system of claim 14 wherein said first and second memory means correspond respectively to the number of AND gates in said first and third gate circuits.

* * * * *